US010358979B2

(12) United States Patent
Kraft et al.

(10) Patent No.: US 10,358,979 B2
(45) Date of Patent: Jul. 23, 2019

(54) TURBOCOOLED VANE OF A GAS TURBINE ENGINE

(71) Applicant: POWERPHASE LLC, Jupiter, FL (US)

(72) Inventors: Robert J. Kraft, Tequesta, FL (US); Scott Auerbach, Jupiter, FL (US); Peter A. Sobieski, Seabrook, TX (US)

(73) Assignee: POWERPHASE LLC, Jupiter, FL (US)

(*) Notice: Subject to any disclaimer, the term of this patent is extended or adjusted under 35 U.S.C. 154(b) by 696 days.

(21) Appl. No.: 14/972,403

(22) Filed: Dec. 17, 2015

(65) Prior Publication Data
US 2016/0230665 A1 Aug. 11, 2016

Related U.S. Application Data

(60) Provisional application No. 62/112,263, filed on Feb. 5, 2015.

(51) Int. Cl.
F02C 7/18 (2006.01)
F01D 25/12 (2006.01)
F01D 5/18 (2006.01)
F02C 6/08 (2006.01)
F02C 7/08 (2006.01)

(52) U.S. Cl.
CPC .............. F02C 7/185 (2013.01); F01D 5/187 (2013.01); F01D 25/12 (2013.01); F02C 6/08 (2013.01); F02C 7/08 (2013.01); F02C 7/18 (2013.01); F05D 2220/32 (2013.01); F05D 2260/213 (2013.01); F05D 2260/232 (2013.01)

(58) Field of Classification Search
CPC .... F02C 7/185; F02C 7/08; F02C 7/18; F02C 6/00; F02C 6/08; F01D 5/187; F01D 25/12; F05D 2260/213; F05D 2260/232
See application file for complete search history.

(56) References Cited

U.S. PATENT DOCUMENTS

| 3,663,118 A | 5/1972 | Johnson |
| 3,796,045 A | 3/1974 | Foster |
| 4,528,811 A * | 7/1985 | Stahl ..................... F01K 23/064 60/39.52 |
| 5,611,197 A | 3/1997 | Bunker |
| 5,640,840 A | 6/1997 | Briesch |
| 6,050,079 A | 4/2000 | Durgin et al. |

(Continued)

FOREIGN PATENT DOCUMENTS

WO WO 2013/116185 8/2013

OTHER PUBLICATIONS

International Search Report and Written Opinion dated May 1, 2017 for International Patent Application No. PCT/US2016/045487.

(Continued)

Primary Examiner — Steven M Sutherland
(74) Attorney, Agent, or Firm — Lathrop Gage LLP

(57) ABSTRACT

The present invention discloses a novel apparatus and methods for augmenting the power of a gas turbine engine, improving gas turbine engine operational flexibility and efficiency, and reducing the response time necessary to meet changing demands of an electrical grid. Improvements in power augmentation and engine operation include systems and methods for providing rapid response given a change in electrical grid.

14 Claims, 9 Drawing Sheets

(56) References Cited

U.S. PATENT DOCUMENTS

| | | |
|---|---|---|
| 6,481,212 B2 | 11/2002 | Priestley |
| 7,412,320 B2 | 8/2008 | Brummel |
| 7,670,108 B2 | 3/2010 | Liang |
| 8,079,802 B2 | 12/2011 | Takamura et al. |
| 9,080,458 B2 | 7/2015 | Romanov |
| 9,784,185 B2 | 10/2017 | Kolvick |
| 2007/0006592 A1 | 1/2007 | Balan et al. |
| 2011/0181050 A1 | 7/2011 | Dinu |
| 2012/0297789 A1 | 11/2012 | Coffinberry et al. |
| 2013/0187007 A1* | 7/2013 | Mackin .................... F02C 6/08 244/134 R |
| 2014/0373551 A1 | 12/2014 | Kraft et al. |
| 2016/0069264 A1 | 3/2016 | Brostmeyer et al. |
| 2016/0341125 A1 | 11/2016 | Kraft et al. |

OTHER PUBLICATIONS

International Search Report and Written Opinion dated Mar. 11, 2016 for International Patent Application No. PCT/US2016/012617.

\* cited by examiner

TURBOCOOLED VANE OF A GAS TURBINE ENGINE

CROSS-REFERENCE TO RELATED APPLICATIONS

This application claims priority to U.S. Provisional Application Ser. No. 62/112,263, filed on Feb. 5, 2015, which is incorporated by reference herein in its entirety.

TECHNICAL FIELD

The invention relates generally to electrical power systems, including the generating capacity of a gas turbine engine, and more specifically to providing an alternate source of cooling air for components of the gas turbine engine.

BACKGROUND OF THE INVENTION

Gas turbine engines are widely understood to be used in conjunction with generators for turning mechanical shaft power into electrical power. Referring initially to FIG. 1A, a schematic for a simple cycle gas turbine engine 100 commonly used in an electrical generating power plant is depicted. The gas turbine engine 100 comprises a compressor 102 coupled to a turbine 104 by a shaft 106. Air from the compressor 102 is directed to one or more combustors 108 where fuel 110 is added to the air. The fuel and air mixture is ignited to form hot combustion gases which drive the turbine 104, which, in turn, drives the compressor 102. The shaft 106 is also coupled to a generator 112, which produces electric power 114. FIG. 1B shows the corresponding gas turbine performance for thermal efficiency as a function of specific output for both simple cycle efficiency and power output for various gas turbine pressure ratio and firing temperatures. As one skilled in the art understands, the firing temperature of a gas turbine engine regulates and limits the overall operation of the engine and the pressure ratio is directly proportional to the efficiency of the gas turbine. For combined cycle gas turbines, as shown in FIG. 2B, the efficiency of the plant is directly proportional to the firing temperature. In other words, increasing firing temperature increases the output of a simple cycle gas turbine, assuming the mass flow is the held constant, and increases the efficiency of the same gas turbine when operating in combined cycle.

In general, the gas turbine original equipment manufacturers have increased firing temperature by improving the technology of the materials and coatings in the turbine section so hotter gasses can be passed through the turbine while maintaining the capability of the turbine parts.

Referring now to FIG. 2A, a schematic for a combined cycle power plant 200 is depicted and comprises a compressor 202 coupled to a turbine 204 by a shaft 206. Air from the compressor 202 is directed to one or more combustors 208 where fuel 210 is added to the air from the compressor 202. The fuel and air mixture is ignited to form hot combustion gases which power a turbine 204, and drives the compressor 202. The shaft 206 is also coupled to a generator 212, which produces electric power 214. A combined cycle power plant 200 also includes a heat recovery steam generator, or HRSG, 216, which receives hot exhaust from turbine 204 and heats a water source to generate steam 218. A steam turbine 220 is powered with steam from the HRSG 216, with the steam turbine 220 driving a second generator 222 for generating additional electrical power 224. FIG. 2B shows the corresponding gas turbine performance for efficiency as a function of firing temperature for both the combined cycle efficiency and power output. FIGS. 1B and 2B are similar to those disclosed in GE Gas Turbine Performance Characteristics (GER3567) and are included herein for reference purposes.

As one skilled in the art understands, firing temperature is defined as the temperature of the combustion gases just downstream of the first stage turbine nozzle. Due to different terminology used in the field of gas turbine engines, the first stage turbine nozzle may also be referred to as a first stage turbine vane. Referring to FIG. 3, a cross section of a portion of a gas turbine engine is depicted and indicates standard temperature parameters utilized in the gas turbine industry. FIG. 3 is also similar to that disclosed in the GE Gas Turbine Performance Characteristics (GER3567) paper referenced above. As shown in FIG. 3, turbine inlet temperature ($T_A$) is measured upstream of a first stage turbine nozzle 300, as depicted by plane A-A. The firing temperature of the engine ($T_B$) is measured just aft of the first stage turbine nozzle, as depicted by plane B-B.

As discussed above, turbine inlet temperature and turbine firing temperature are critical measures by which gas turbine engine operation is based. These temperature readings are taken upstream and downstream of the first stage turbine nozzle, respectively. As such, it is important for the turbine nozzle metal temperature to be maintained within acceptable material operating limits as control of the gas turbine engine is based off of these temperatures.

Due to the high operating temperature of the turbine nozzle, it is necessary to actively cool the turbine nozzle in order to maintain metal temperatures at an acceptable level. Cooling fluid, such as compressed air, is provided to the turbine nozzle as part of the overall Turbine Cooling and Leakage Air (TCLA), or compressed air bypassing the combustion process and used for cooling. TCLA is typically taken from multiple locations in the compressor, including the discharge plenum of a gas turbine engine, with the amount required for cooling turbine components varying by component and by engine type. However, for a General Electric Frame 7FA engine, approximately 20% of the compressed air generated by the engine compressor is used as TCLA. That is, using 20% of the compressed air for cooling means this air cannot go through the combustion system, or is unfired going through the turbine, thereby translating into lost energy for the engine and contributing to the poor thermal efficiency of the gas turbine engine. For example, the aforementioned gas turbine engine has a thermal efficiency of approximately, which is approximately 37 percent.

FIG. 4, which is similar to that disclosed in GE Gas Turbine Performance Characteristics (GER3567), depicts a typical cooling scheme for a first stage turbine nozzle 400. In such a cooling arrangement, compressed air is supplied to an internal passage of the turbine vane and is often directed through a plurality of passageways within the nozzle, some of which can be serpentine in shape. The air for cooling the first stage turbine nozzle is typically produced by the compressor and is taken from a compressor discharge plenum and therefore is at the exit pressure and temperature of the engine compressor. This first stage nozzle, which sees the highest temperature gases from the combustor, is also supplied with the sources of highest pressure cooling air, from the compressor discharge plenum (CDP). That is, the pressure of the gas path is just a couple of pounds per square inch (psi) less than that of the combustor. Therefore, as one skilled in the art can appreciate, the pressure of the cooling air supplied to the leading edge 402 of the first stage nozzle 400 is just high enough to cause air to flow out a series of holes in the airfoil. Cooling hole spacing and orientation can vary, but one such common style places holes in the leading edge 402 of the nozzle 400, also referred to as a showerhead pattern. Further, taking air from the engine compressor to cool the turbine components reduces the power output from the engine, and thus the amount of mechanical work able to be generated by the turbine.

Referring now to FIG. 5, a cross section view of a portion of a gas turbine engine in accordance with a cooling scheme of the prior art is depicted. The gas turbine engine 500 comprises a compressor 502 providing a flow of compressed air into a discharge plenum 504. Most of the air from the compressor 502 passes through one or more combustors 506, the one or more combustors 506 having a combustor case 508, an end cap 510, a combustion liner 512, a swirler assembly 514, a transition piece 516, and a bracket 518 that holds the transition piece 516 to a portion of a turbine frame, here the first stage vane outer ring 520. Air is received in the combustor 506 and mixed with fuel from one or more fuel nozzles 522 to create hot combustion gases passing through the transition piece 516 and into the turbine. In this embodiment, the first stage vane outer ring 520 is fastened to the compressor discharge plenum (CDP) case 524.

Air is maintained in the compressor discharge plenum by seal 526 between the rotor 528 and an inner casing 530 such that most of the air goes to the combustor 506 or for TCLA. The inner casing 530 has a mechanical interface 532 with the first stage turbine nozzle 531 for providing needed structural axial and torsional support. The inner casing 530 is generally supported within compressor discharge plenum case 524 by ID struts 534 located between adjacent combustors 506. The rotor 528 has bearings 536 that tie the rotor 528 to the casing through struts 534.

The cooling air 541 is supplied to the outer diameter of the first turbine nozzle 531 and passes between the first outer vane ring 520 and the compressor discharge plenum case 524 and enters into holes on the first vane outer ring 543 as the first vane outer ring feeds the vane 531 with compressed air from the compressor discharge plenum 504. In this embodiment of the present invention, the compressed air from the compressor discharge plenum 504 is approximately 750 deg. F. at ISO conditions and base load. Similarly, the inner diameter of the first stage nozzle 542 is supplied with turbine cooling and leakage air (TCLA) 552 from the compressor discharge plenum 504. Both first stage nozzle cooling air 541 and 552 flows through the internal passages 531 of the vane, as disclosed in FIG. 4, providing the necessary cooling to the first stage nozzle 542. Eventually this TCLA joins with the hot combustion gases passing between the first stage nozzles 542 and acts as a coolant to reduce the temperature of the hot gases to which the first stage blade 511 is exposed. On subsequent nozzle and rotor stages, the second stage nozzle is sealed to the rotor with a second stage inner support ring 554 and similarly on the third stage with a third stage inner support ring 553.

The following discussion pertains to a General Electric Frame 7FA gas turbine engine at ISO conditions and base load and is provided merely for illustrative purposes as an acceptable engine with which the present invention can be utilized and is not meant to limit the scope of the invention discussed below. The majority (about 80%) of the compressed air from the compressor passes through the combustion system where fuel is added and the mixture is ignited, raising the temperature of the hot combustion gases to approximately 2700 deg. F. There is typically a two to three pound per square inch (psi) pressure drop as the compressed air goes through the combustor. Therefore, because of this arrangement, there is very little pressure margin to cool the nozzle, especially its leading edge. Typically on an F-class gas turbine engine, approximately 10% of the cooling air is diverted from the combustion process and is used to cool the vane. For example, for the 7FA engine, compressor discharge air at approximately 750 deg. F. and 220 psi is used to cool the first stage nozzle. During the cooling process, this air increases in temperature by approximately 250 deg. F. and is then discharged into the gas path, thereby diluting the hotter (2700 deg. F.) temperature gasses coming from the combustion process, yielding a firing temperature. A typical firing temperature for the 7FA engine is approximately 2450 deg. F. (as taken at plane B-B) and comprises 900 lb/sec of hot combustion gasses at a temperature of approximately 2700 deg. F. from the combustion process and 100 lb/sec of air at approximately 1000 deg. F. from the cooling air for the nozzle. Therefore, this yields a firing temperature of 2540 deg. F. at plane B-B [(2700*900+100*1000)/1000=2540 deg. F.]. The reason for the higher temperature in the calculation (2540 F>2450 F) is because there is also some combustion dilution and cooling air that mixes out and reduces the actual temperature exiting the combustor, therefore, reducing the temperature at plane B-B. To estimate the effective combustion dilution and leakage air which is at compressor exit temperature (750 deg. F.), (2700*900+100*1000+Flow*750)/(1000+Flow)= 2450, and when solving for the flow, Flow=5. Therefore, with a compressor inlet flow of approximately 1005 lb./sec, 900 lb./sec goes through the combustion process, and approximately 5 lb./sec leaks and dilutes the combustion process and 100 goes to the first stage nozzle cooling. These numbers do not reflect the fact that in the compressor of the gas turbine, approximately 10% of the 1005 lb./sec going to the turbine inlet is removed before it exits the combustor in order to cool the rotating section and later static sections of the turbine. Therefore, for the example discussed above, all the flow numbers are reduced by 10%, or the combustor flow is approximately 810 lb./sec, the first stage nozzle flow is approximately 90 lb./sec and the combustor dilution and leakage rate is 4.3 lb./sec. As one skilled in the art can appreciate, these numbers are approximate, however, when the leakage and cooling air is mixed in plane B-B, a blended temperature of 2450 deg. F. (firing temperature) results.

An industry standard for determining the cooling benefit achieved through the cooling air is its cooling effectiveness. Cooling effectiveness is understood to be the ratio of the difference between the hot combustion gas temperature and the average metal temperature of the turbine nozzle divided by the difference between the hot combustion gasses and the temperature of the cooling air. As an example, the cooling effectiveness of the first stage turbine vane of the 7FA engine discussed above is approximately 0.59 (the ratio of the temperature difference between the hot combustion gasses (~2700) and average metal temperature (~1550) divided by the difference between the hot combustion gasses and cooling air temperature (~750 F)).

Cooling the highest temperature components, typically the first stage nozzles and first stage blades, is a technology on which every gas turbine engine original equipment manufacturer (OEM) spends significant financial resources. For example, over the last twenty years, large frame gas turbine engines have been improved, but thermal efficiency improvement has risen from about 33% to only about 37%.

SUMMARY

The current invention provides several embodiments for improving the cooling efficiency of gas turbine components, including a first stage turbine nozzle.

In an embodiment of the present invention, a system and method are provided for directing cooling air to a turbine vane comprising an auxiliary source of compressed air having a heated engine, an auxiliary compressor, and a recuperator for providing a supply of heated auxiliary compressed air. The heated auxiliary compressed air is supplied to the plurality of turbine vanes through a conduit such that the auxiliary source of compressed air provides a dedicated supply of cooling air for cooling the turbine vanes.

In an alternate embodiment of the present invention, a system and method are provided for selectively providing cooling air to a turbine vane. A plurality of air cooled turbine vanes, an auxiliary source of compressed air having a heated engine, an auxiliary compressor, and a recuperator are provided. The auxiliary compressed air is supplied to the plurality of turbine vanes through a conduit where the air is selectively directed to cool the turbine vanes. When the auxiliary source of compressed air is not utilized, cooling air for the turbine vanes is supplied from the gas turbine engine compressor.

In an embodiment of the present invention, at least a portion of required turbine cooling and leakage air (TCLA) is provided by an auxiliary source of compressed air having a temperature cooler than the prior art cooling designs, thus reducing the quantity of TCLA required and improving overall efficiency.

Additional advantages and features of the present invention will be set forth in part in a description which follows, and in part will become apparent to those skilled in the art upon examination of the following, or may be learned from practice of the invention. The instant invention will now be described with particular reference to the accompanying drawings. Although the first stage nozzle is used as the example for the embodiment, it is intended that this approach outlined in this invention can apply to other components within the turbine section.

BRIEF DESCRIPTION OF THE SEVERAL VIEWS OF THE DRAWINGS

The present invention is described in detail below with reference to the attached drawing figures, wherein.

DETAILED DESCRIPTION

The present invention relates to methods and systems of providing cooling air to a plurality of gas turbine engine components such as a turbine vane, and more specifically, a first stage turbine vane so as to improve the overall efficiency of the gas turbine engine. PowerPHASE LLC, the assignee of the present invention, has a patent pending supplemental compression system known as Turbophase® that delivers air to the compressor discharge region through a compression and heating process that is driven by a separately fueled engine where the waste heat from the engine is used to heat the air compressed prior to injection in the gas turbine engine. Prior art air compression and supply devices fail to provide compressed air at the necessary temperature and pressure to provide ample cooling and improve thermal efficiency of the gas turbine engine.

Figure 1B:
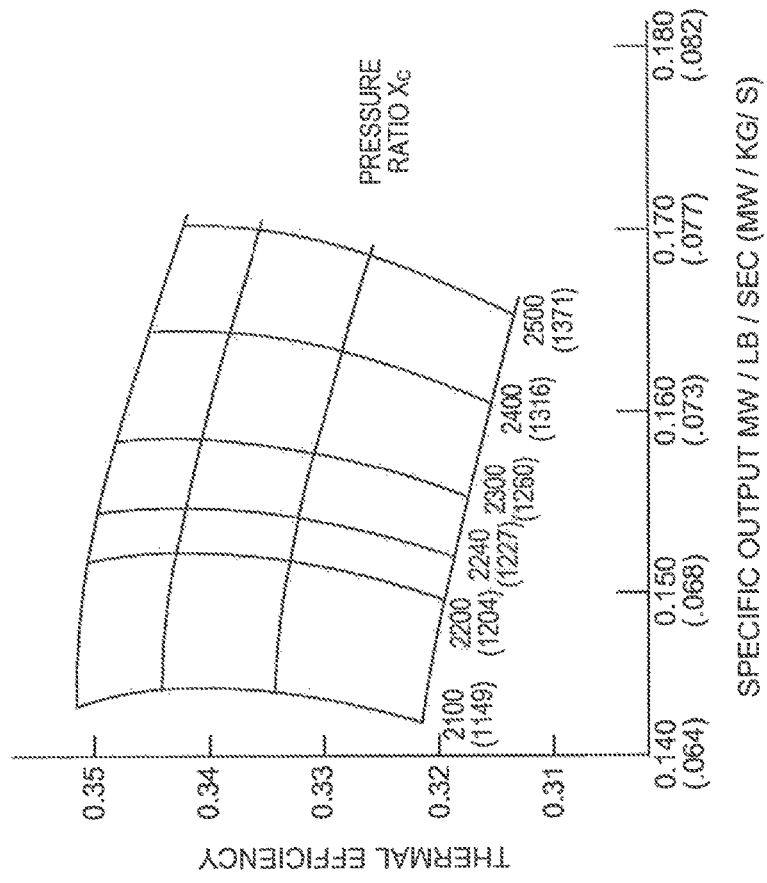
FIG. 1B depicts the firing temperature relationship to thermal efficiency and output of the engine of FIG. 1A.
Figure 1A:
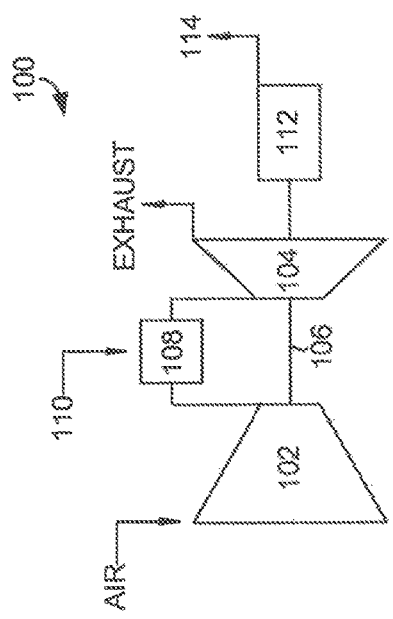
FIG. 1A depicts a schematic drawing of a simple cycle gas turbine engine.
Figure 2B:
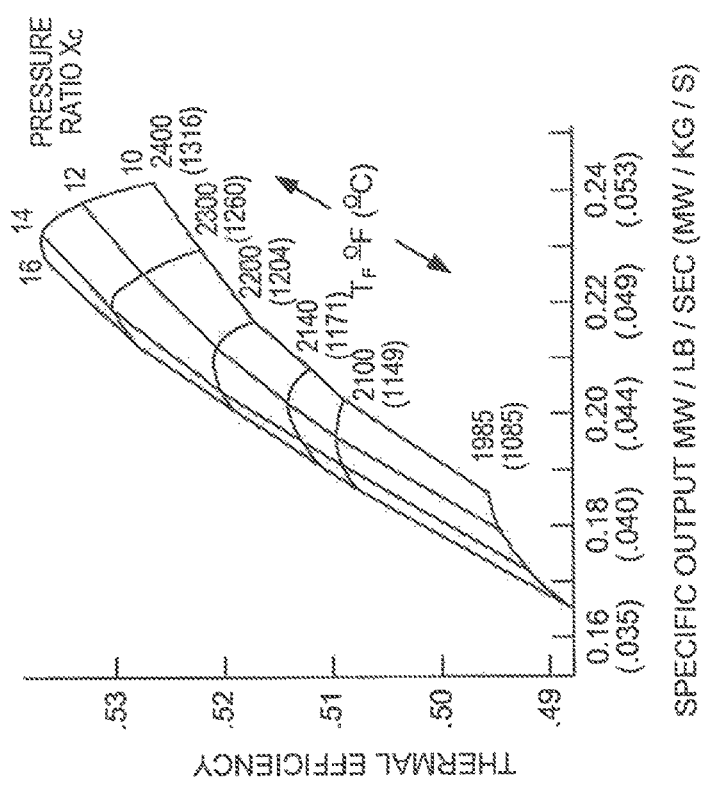
FIG. 2B depicts the firing temperature relationship to thermal efficiency and output of the engine of FIG. 2A.
Figure 2A:
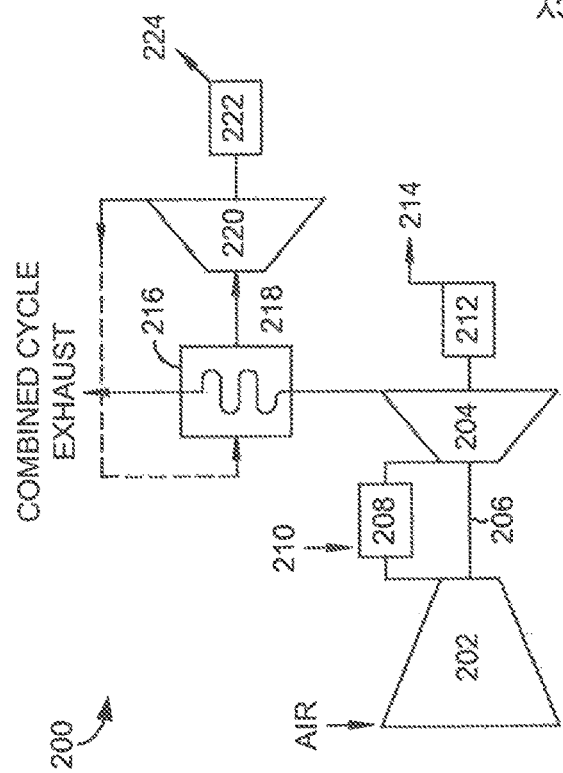
FIG. 2A depicts a schematic drawing of a combined cycle gas turbine engine.
Figure 3:
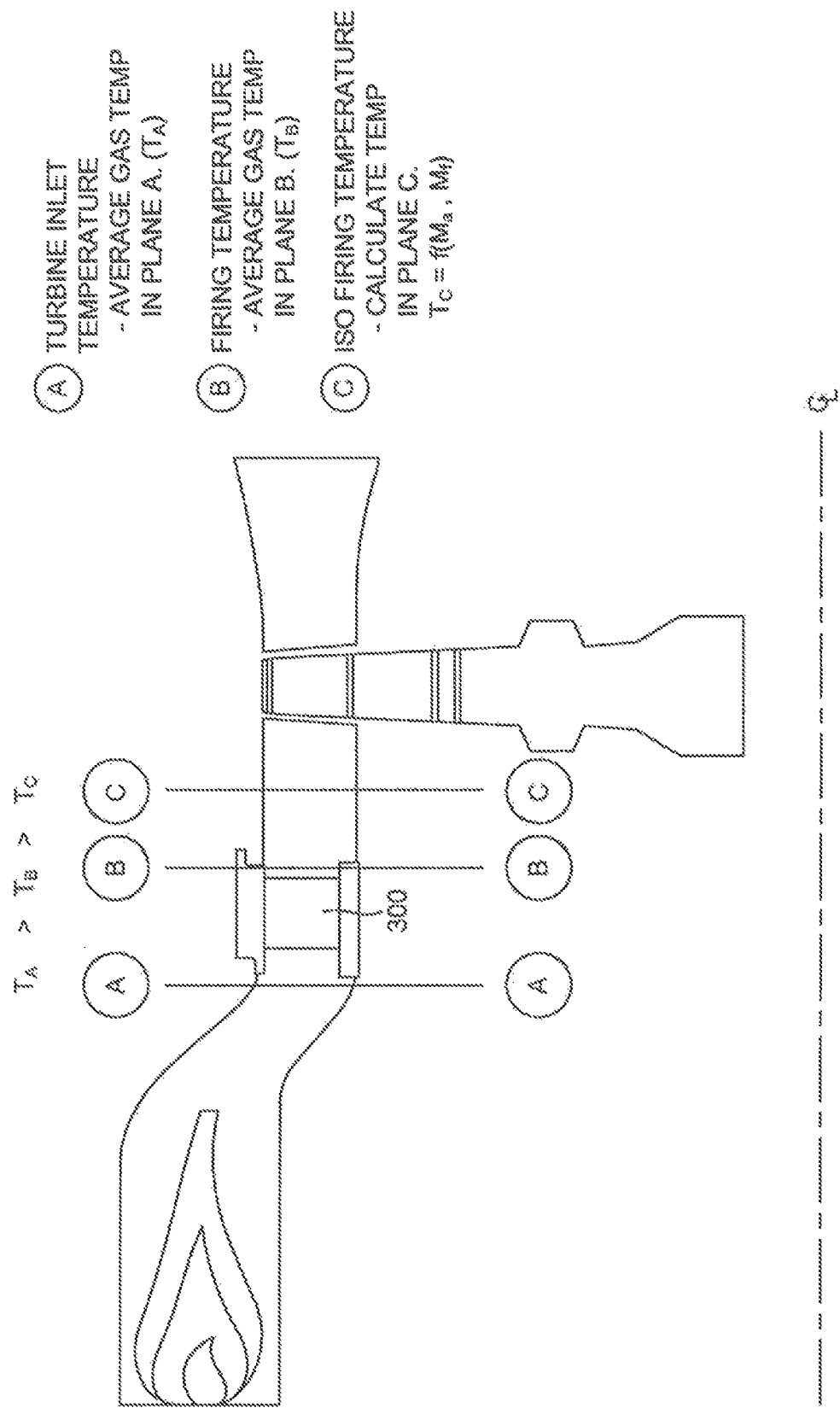
FIG. 3 depicts a partial cross section view of a gas turbine engine indicating axial locations at which standard temperatures are measured.
Figure 4:
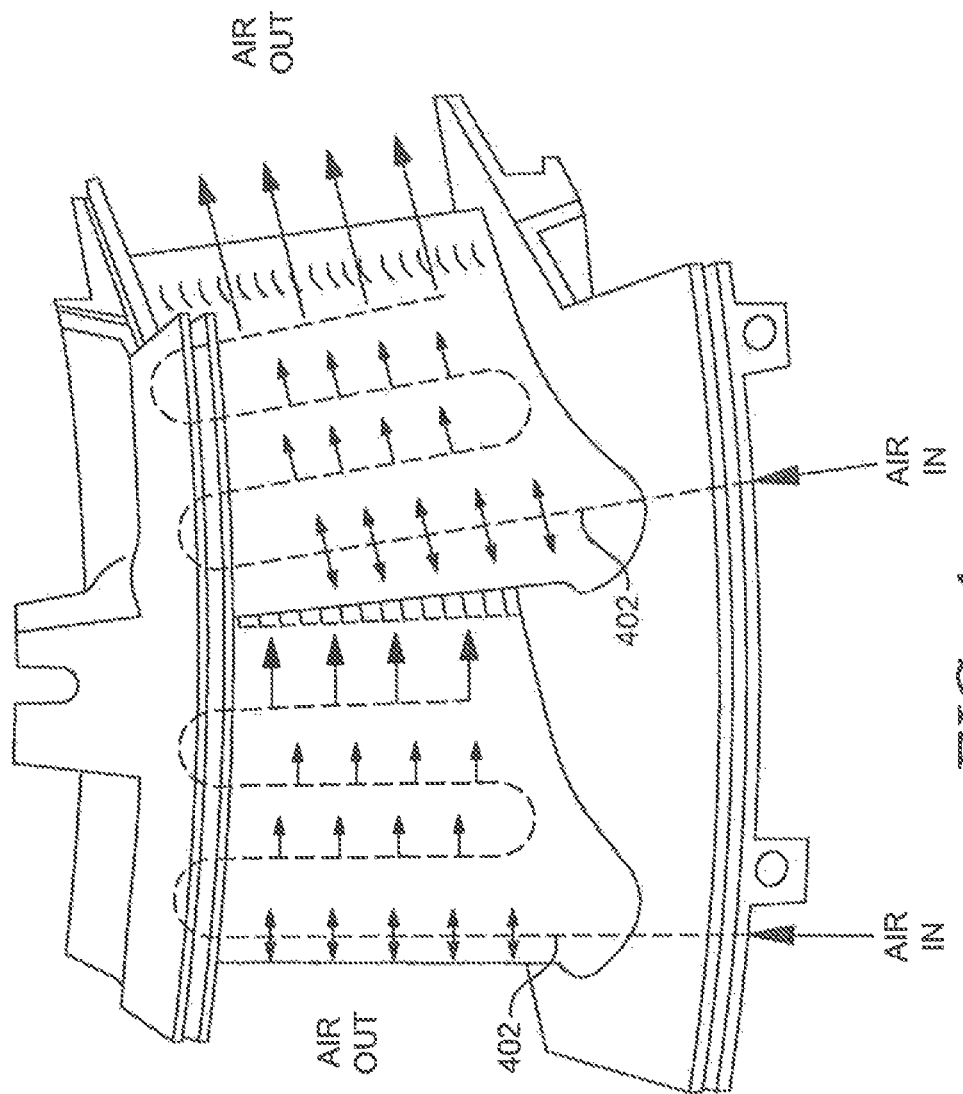
FIG. 4 is a perspective view of a typical gas turbine nozzle depicting its cooling pattern.
Figure 5:
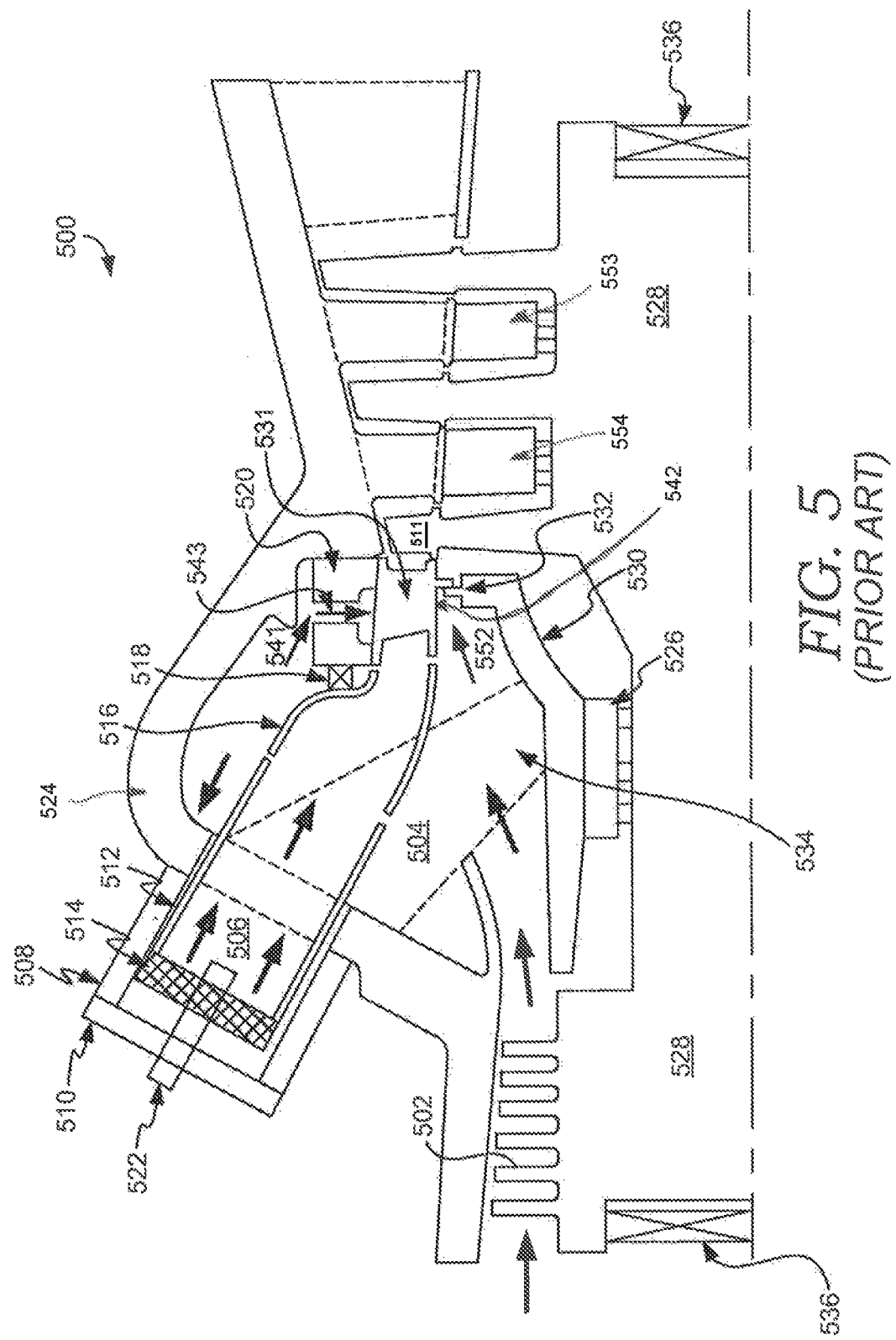
FIG. 5 is a partial cross section view of a gas turbine engine providing a way of directing cooling air to a first stage turbine vane in accordance with the prior art.
Figure 6:
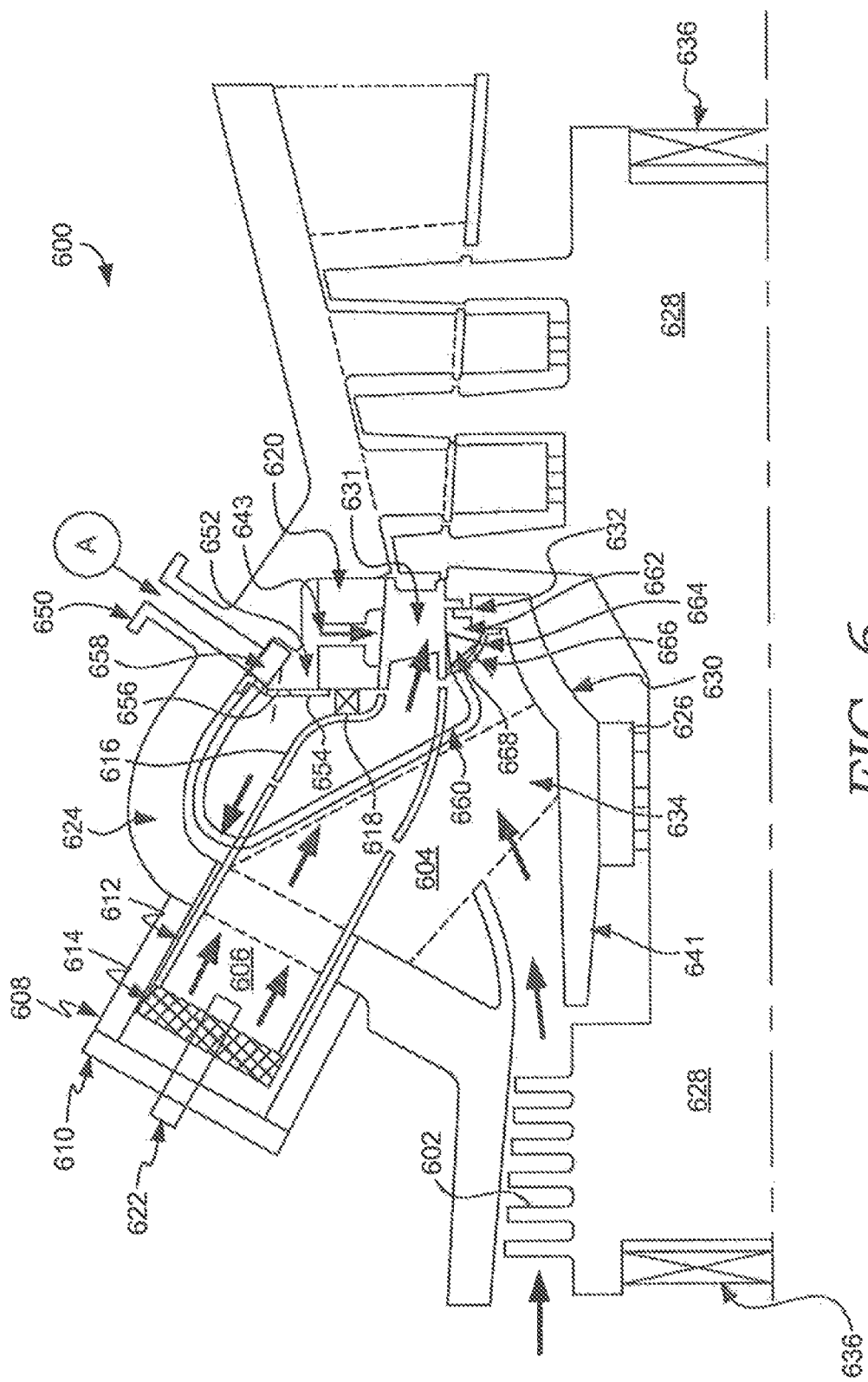
FIG. 6 is a partial cross section view of a gas turbine engine providing a way of directing cooling air to a first stage turbine vane in accordance with an embodiment of the present invention.

Referring now to FIG. 6, a system 600 is shown for providing an alternate source of cooling to a first stage turbine vane 631. The system 600 comprises a compressor 602 providing a flow of compressed air into a discharge plenum 604. Most of the air from the compressor 602 passes through one or more combustors 606, the one or more combustors 606 having a combustor case 608, an end cap 610, a combustion liner 612, a swirler assembly 614, a transition piece 616, and a bracket 618 that holds the transition piece 616 to a portion of a turbine frame, here the first stage vane outer ring 620. Air is received in the combustor 606 and mixed with fuel from one or more fuel nozzles 622. In this embodiment, the first stage vane outer ring 620 is fastened to the compressor discharge plenum (CDP) case 624.

Air in the compressor discharge plenum is sealed between the rotor 628 and an inner casing 630 by seal 626 such that most of the air goes to the combustor 606 or for TCLA (Turbine Cooling and Leakage Air). The inner casing 630 has a mechanical interface 632 with the first stage nozzle 631 for providing needed structural axial and torsional support. The inner casing 630 is generally supported within compressor discharge plenum case 624 by ID struts 634 located between adjacent combustors 606. The rotor 628 has bearings 636 that tie the rotor 628 to the casing through struts 634.

Figure 7:
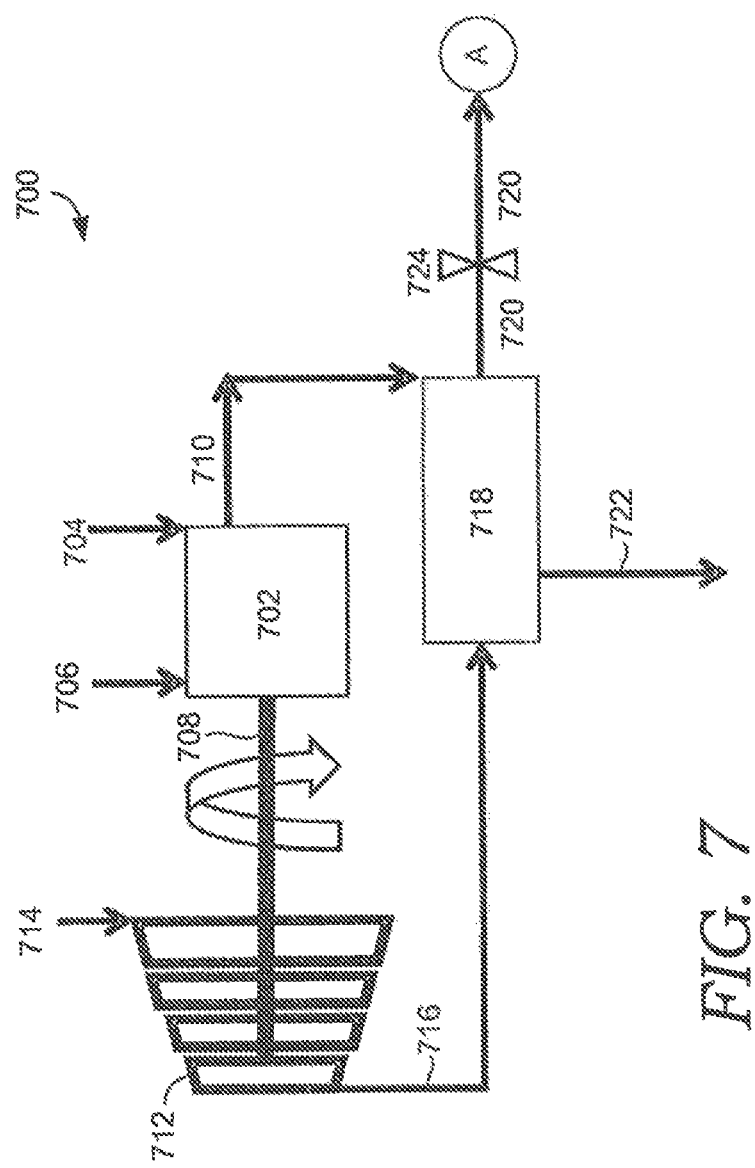
FIG. 7 is a schematic drawing of an auxiliary source of compressed air in accordance with an embodiment of the present invention.

Continuing with respect to FIG. 6, the system 600 also provides an alternate source of TCLA to the first stage nozzle 631 of a gas turbine engine. An air supply source is provided at A to flange 650 for case 624. This air supply source A is generated from an auxiliary source, as shown in FIG. 7. More specifically, and with reference to FIG. 7, an auxiliary source of compressed air 700 comprises a fueled engine 702 which receives air 704 and engine fuel 706 and produces mechanical shaft power 708 and hot exhaust 710. The engine fuel 706 can be natural gas or a liquid fuel. The mechanical shaft power 708 is used to drive a multi-stage intercooled compressor 712 where ambient air 714 is taken in and compressed and cooled at each stage of the compressor 712. The compressor 712 produces a supply of warm compressed air 716 which is directed through a recuperator 718, further heating the compressed air 716 with the hot exhaust 710 from the fueled engine 702, thereby producing heated compressed air 720 and warm exhaust 722. This heated compressed air has a temperature of approximately 400 deg. Fahrenheit and warm exhaust 722. The auxiliary source of compressed air 700 can also include a valve 724 for regulating the flow of heated compressed air 720.

One such auxiliary source of compressed air representative of FIG. 7 and capable of being utilized with the present invention is the patent pending Turbophase® system produced by PowerPHASE LLC of Jupiter, Fla. In this system, air is compressed and heated to an intermediate temperature of approximately 400 F and supplied at a slightly higher pressure than compressor discharge pressure of the compressor 602. The heated compressed air 720 is generated approximately 25% more efficiently than the compressed air from compressor 602 due to the patent pending generation process of the system.

Referring back to FIG. 6, the auxiliary source of compressed air 700, denoted as A in FIG. 6, is injected into an outer diameter plenum 652 that is formed with a seal 654 between the compressor discharge plenum 624 and the first stage turbine vane support ring 620. The seal 654 further comprises air supply holes 656 for supplying the TCLA air. This plenum 652 also comprises a swirler 658 which is designed to provide multiple functions. That is, when heated compressed air is being delivered at A, the tangential swirl of the air reduces the actual flow of air that can enter the first stage nozzle 631 and aerodynamically blocks some of the air from the compressor 602 from flowing through the supply holes 656. When heated compressed air is not being supplied at A, the supply holes 656 are large enough in size to supply the turbine nozzle 631 with the required level of cooling air. Air is then supplied to the vane 631 through inlet 643. If the supply of compressed air at A is prime reliable, the supply holes 656 can be removed.

Compressed air for cooling can also be provided to the inner diameter region of the first stage nozzle 631. More specifically, and with reference to FIG. 6, compressed air is taken from plenum 652 and directed through multiple pipes 660 to an inner diameter plenum 662 and into the inner diameter region of the first stage nozzle 631. Also located at the inner diameter plenum 662 is a seal 664 positioned between the first stage nozzle inner diameter platform and the inner case 641. This seal 664 has TCLA supply holes 666 placed therein. This plenum 662 also contains a swirler 668 that is designed to provide two functions. First, when compressed air from the auxiliary source of compressed air 700 is being delivered at A, a tangential swirl is imparted reducing the actual flow of air that can get onboard the first stage nozzle 631 and aerodynamically blocks some of the compressor discharge air from flowing through the TCLA supply holes 666. When the auxiliary source of compressed air 700 is not delivering air, the TCLA supply holes 666 are large enough to supply the first stage nozzle 631 with the current level of TCLA. If the Turbophase® TCLA is prime reliable, the TCLA supply holes 666 can be removed.

Figure 8:
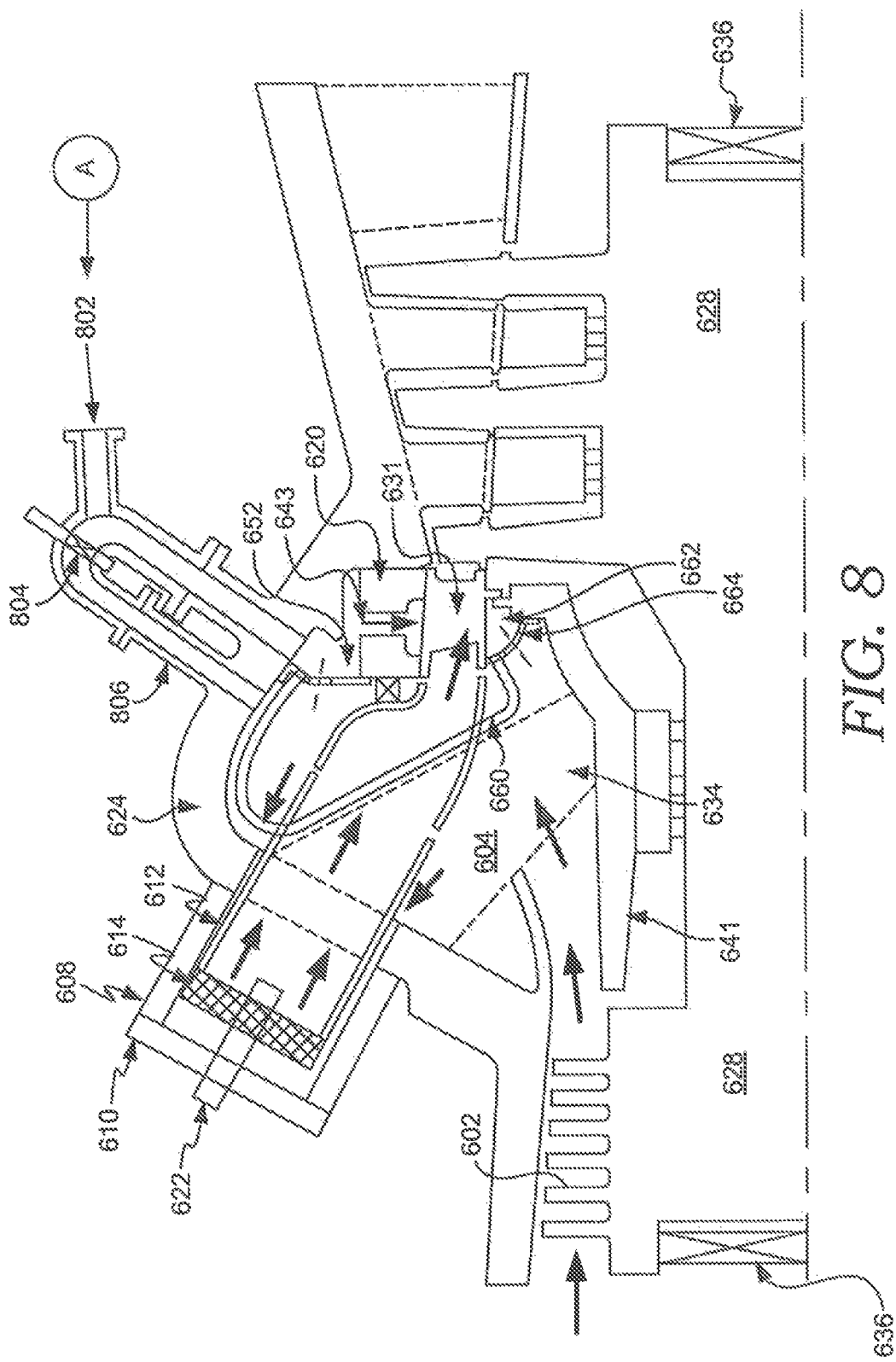
FIG. 8 is a partial cross section view of a gas turbine engine providing a way of selectively directing cooling air to a first stage turbine vane in accordance with an alternate embodiment of the present invention.

Referring now to FIG. 8, an alternate embodiment of the present invention is depicted. In this embodiment of the present invention, compressed air from an auxiliary source of compressed air, depicted as A, is provided into inlet flange 802. Located adjacent the inlet flange 802, is a control valve 804. When the control valve 804 is closed, all of the air is forced to go into the first stage nozzle outer diameter region 652 and the first stage nozzle inner diameter region 662, by way of pipes 660 to supply air to the first stage nozzle 631.

As one skilled in the art can appreciate, the valve 804 can be a control valve or a check valve. If the auxiliary source of compressed air is not operational and supplying air, then the control valve 804 is open and air can flow from the gas turbine compressor discharge plenum 604 through compressor discharge flange 806 into the outer diameter plenum 652 and inner diameter plenum 662, via pipes 660, to supply air to the first stage nozzle 631. If valve 804 is open and there is air being supplied at A, depending on the pressure and flow of the added air, air from the gas turbine's compressor discharge case may flow into or out of flange 806. If flow is flowing out of flange 806, then the resultant temperature of the mixed air stream, the mixture of the air from the auxiliary compressor source A and the air from the gas turbine compressor discharge case, will result in a mixed out temperature. Since the gas turbine compressor exit temperature is typically about 750 deg. F. and the air being supplied from the auxiliary compressor is lower than 750 deg. F., the mixed out temperature will be cooler than the compressor discharge temperature. If no air is supplied from the auxiliary compressor source A, then the compressor discharge air would flow out of flange 806 and supply cooling air to the nozzle.

By having higher pressure air available from an external compressor at A, other functions can be accomplished. Typically in gas turbines, the space between the rotating blade inner diameter platforms and the adjacent upstream and downstream nozzles, also known as rim cavities, is a very sensitive and sometimes troublesome area to keep cool. The pressurized gas in the flow path is discouraged from flowing into the rim cavities by providing TCLA to the rim cavities where the TCLA has a higher pressure than the pressurized gas in the flow path. Several gas turbines today have extremely low pressure margin in the rim cavities, and consequently are limited in their operation or are forced to significantly increase TCLA to maintain proper rim cavity temperatures. Since the auxiliary source of compressed air can supply air at a higher pressure than the engine compressor 602, or TCLA pressure, the current TCLA usage can be reduced which will result in improved engine efficiency.

A characteristic of a typical gas turbine engine is that as coolant temperature is reduced, less air is required to perform the same level of cooling in order to maintain a minimum metal temperature on the cooled components in the turbine. This can lead to an improvement in efficiency. For example, alternate original equipment manufacturers including Siemens Westinghouse and Mitsubishi Heavy Industries employ a cooling system for TCLA that is also used in part of the turbine. This system is called a Rotor Air Cooler (RAC) system and routes a portion of the TCLA outside the gas turbine engine to a cooler, where the air temperature is reduced from about 750 deg. F. to approximately 450 deg. F. This temperature reduction is sufficient enough to reduce the amount of cooling air needed, but still high enough to eliminate risk of thermal shock to the parts receiving the cooled air. After the cooler, the RAC air is piped back to the rotating section of the gas turbine engine because of the pressure sensitivities discussed earlier.

These performance gains can be made with a passive cooling system, meaning the air from the auxiliary source of compressed air is directed to the inlet of the cooling system for the first stage turbine nozzle such that the control system of the gas turbine can be adjusted appropriately to maintain the same first stage nozzle temperature. With this passive system, when the auxiliary source of compressed air is not running, the firing temperature would remain unaffected, but as the flow rate of the cooler cooling air is directed to the first stage turbine nozzles, then the fuel flow to the combustor can be increased proportionately to increase the power and efficiency of the gas turbine system.

A non-passive, or dedicated system can also be employed where all of the cooling air supplying the first stage nozzle comes from the auxiliary source of compressed air and, as a result, would be a must run and prime reliable system. In this configuration, a higher pressure and different cooling scheme could be deployed increasing the cooling effectiveness of the first stage nozzle. For example, if the cooling effectiveness was able to be improved by approximately 10%, of from 0.59 to 0.65, the volume of cooling air can be reduced about 10 lb./sec which would result in about 4 MW of additional power on a 170 MW gas turbine, or about 2.4% power and efficiency improvement. This incremental power and efficiency is additive to the cooler cooling air and constant cooling effectiveness described above.

Figure 9:
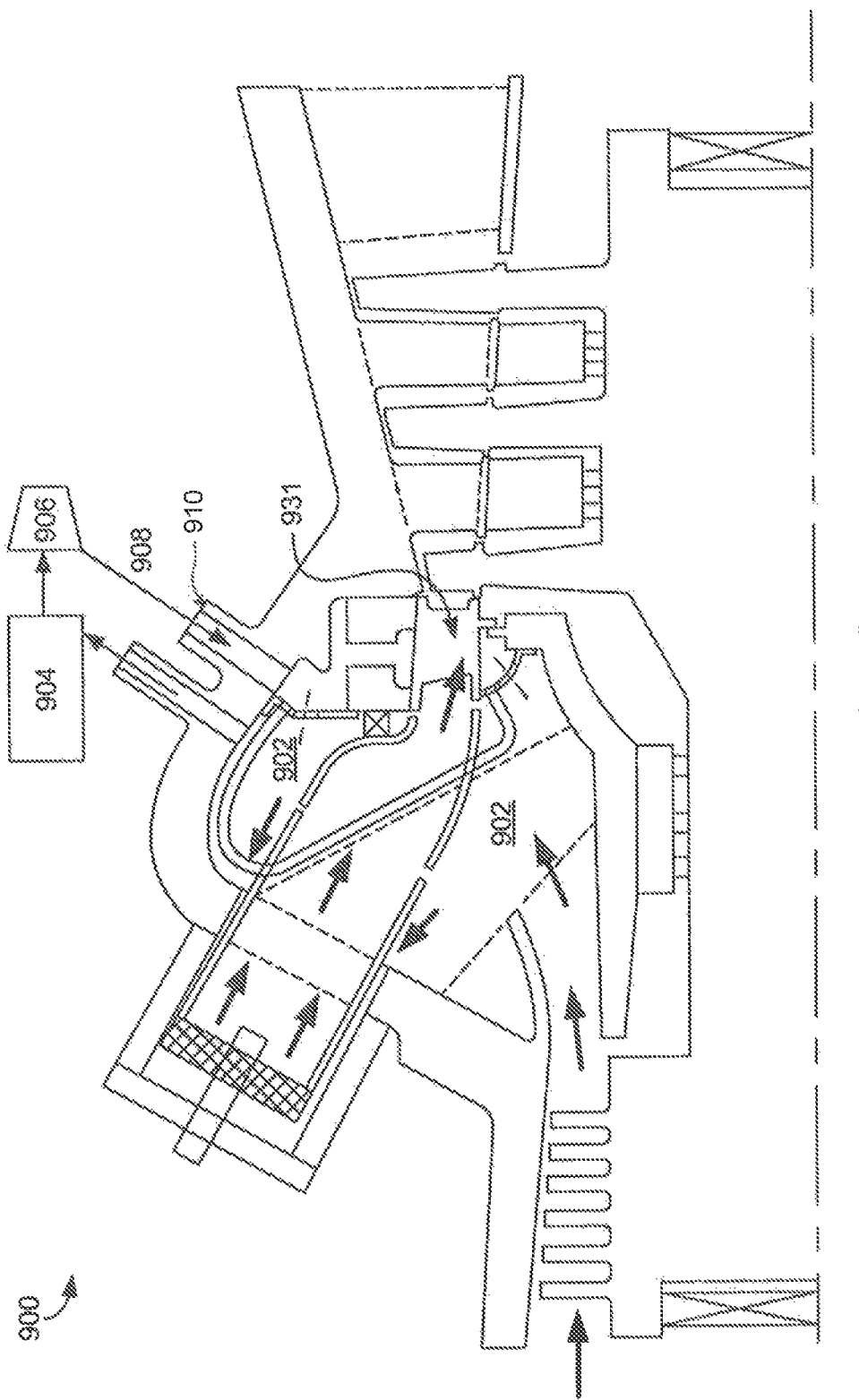
FIG. 9 is a partial cross section view of a gas turbine engine providing an alternate way of directing dedicated cooling air to cool a first stage turbine vane in accordance with an alternate embodiment of the present invention.

Referring now to FIG. 9, an alternate embodiment of a dedicated cooling system 900 involves a closed loop system where air is extracted from the compressor discharge plenum 902, cooled by a cooler 904, and then directed into compressor 906 where the air pressure is further increased. Compressor 906 can be electric driven because there is no need for heat to be added to the air as it is already heated. The pressurized air 908 is then piped into the engine through inlet 910 to a dedicated cooling system to cool the first stage nozzle 931. Instead of the cooling air being discharged into the hot gas path as traditionally done in air cooled nozzles, a portion or all of the cooling air is returned back into the compressor discharge plenum 902 where it goes through the combustion process, effectively recycling the cooling air. One significant benefit of this process is that the mass flow of the exhaust of the gas turbine can be kept relatively constant as no new air is added to the gas turbine cycle and therefore the mass flow of the gas turbine exhaust is relatively unchanged and therefore makes permitting significantly easier.

One significant obstacle to installing incremental power is if the specific emissions (lbs of pollutant per MW generated) is increased and the plant runs the same number of hours, the total pounds of emissions will also increase. By maintaining the mass flow of the gas turbine, the specific emissions from the gas turbine will not increase, while at the same time additional power output is realized. This is a benefit at combined cycle power plants compared to other forms of power augmentation, such as duct burners that have an emissions production much higher than the gas turbine itself for incremental power. The other benefit of the closed loop cooled first vane of FIG. 9 is with the mass flow through the turbine being kept constant, the back pressure on the gas turbine compressor is not impacted, which allows this system to be used at all gas turbine load conditions. Currently, the auxiliary source of compressed air is primarily a power augmentation system, and although it can provide some part load benefits, it is somewhat limited at very low loads due to gas turbine compressor surge limitations. The closed loop cooling system shown in FIG. 9 can be effectively controlled to elevate the temperature of the air being returned from the cooled first vane 931 by increasing or decreasing the cooling that is applied to the air as it is pulled off the compressor discharge plenum which will allow the gas turbine lower operating limit to be lowered further.

However, one must also consider the impacts of using cooler air to cool the turbine nozzle. When using cool compressed air at approximately 400 deg. F., the air exiting the nozzle will be much cooler (approximately 700 deg. F. instead of approximately 1000 deg. F., as with prior art cooling systems. Therefore, the firing temperature will effectively be reduced because of the cooler air exiting the nozzle and mixing with the hot gas path gas. By maintaining the same cooling effectiveness and reducing the coolant temperature the firing temp can effectively be increased. For example, for an embodiment of the present invention, the cooling effectiveness is approximately $0.59=[(2700-1550)/(2700-750)=0.59]$. Holding cooling effectiveness constant with an increased combustor temperature and a lower coolant temperature yields an increase in firing temperature of: $0.59=(\{2700+x\}-1550)/(\{2700+x\}-400)$, $x=504$ F. Therefore, with cooler cooling air to the first stage nozzle the effective firing temperature can be increased about 500° F. while maintaining nozzle metal temperatures and life while significantly increasing the power and efficiency of the gas turbine system. The inverse is also true, if firing temperature is held constant and cooler cooling air is used to cool the first stage nozzle, then the metal temperature is reduced and service life of the component can be extended. There is also a middle ground where, if the firing temperature is held constant and less of the cooler cooling air used to cool the first stage nozzle such that the nozzle metal temperatures are held constant and the service life is held constant, then the combustion temperature is reduced, resulting in lower emissions and lower fuel flow.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive. Specifically, the first stage nozzle is used as an example in this this application, however, the principles apply to the other rotating and stationary turbine components, typically referred to as hot gas path components.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A system for cooling a component of a gas turbine engine comprising:
   an auxiliary compressed air system comprising:
   a separately fueled engine for producing shaft power and exhaust heat;
   a multi-stage intercooled compressor coupled to the separately fueled engine;
   a recuperator for receiving compressed air from the multi-stage intercooled compressor and heating the compressed air with the exhaust heat from the separately fueled engine; and
   a conduit system in communication with the separately fueled engine for directing the compressed air to the component.

2. The system of claim 1 further comprising an air inlet valve.

3. The system of claim 1, wherein the conduit system is configured to direct the compressed air exclusively to the component.

4. The system of claim 1, wherein the conduit system comprises fluid channels both internal and external to the gas turbine engine.

5. A system for cooling one or more components of a gas turbine engine comprising:
   a compressor coupled to a turbine;
   a compressor discharge plenum and combustion section in fluid communication with the compressor and the turbine;
   an external air compression process separate from the gas turbine engine for supplying cooling air to the one or more components, where the cooling air from the external air compression process is configured to have higher pressure than compressed air in the compressor discharge plenum; and
   an air control valve for regulating airflow from the compressor discharge plenum to the one or more components.

6. The system of claim 5, wherein the external air compression process utilizes a multi-stage intercooled compressor to raise pressure of the cooling air above air pressure in the compressor discharge plenum.

7. The system of claim 5, wherein the cooling air for the one or more components is a mixture of air from the compressor discharge plenum and air from the external air compression process.

8. The system of claim 5, wherein the one or more components are turbine components.

9. A system for cooling one or more components of a gas turbine engine comprising:
   a compressor coupled to a turbine;
   a compressor discharge plenum and combustion section in fluid communication with the compressor and the turbine;
   an external air compression process to the gas turbine engine for supplying at least a portion of cooling air to the one or more components, where the cooling air from the external air compression process is configured to have a lower temperature than compressed air in the compressor discharge plenum; and
   an air control valve for regulating airflow from the compressor discharge plenum to the one or more components.

10. The system of claim 9, wherein the external air compression process utilizes a multi-stage intercooled compressor.

11. The system of claim 9, wherein the external air compression process utilizes a separately fueled engine producing shaft power and exhaust heat, a multi-stage intercooled compressor coupled to the separately fueled engine, and a recuperator for receiving compressed air from the multi-stage intercooled compressor and heating the compressed air with the exhaust heat from the separately fueled engine.

12. A system for providing cooling air to one or more gas turbine engine components comprising:
   a compressor discharge plenum in fluid communication with a compressor of a gas turbine engine;
   a cooler in fluid communication with the compressor discharge plenum; and
   an auxiliary compressor in fluid communication with the cooler and with the one or more gas turbine engine components; and
   means for directing compressor discharge air from the compressor into the cooler and to the one or more gas turbine engine components.

13. The system of claim 12, wherein the auxiliary compressor is electrically powered.

14. The system of claim 12, wherein the one or more gas turbine engine components are a plurality of turbine vanes.

* * * * *